United States Patent
Williams

(10) Patent No.: US 10,336,440 B2
(45) Date of Patent: Jul. 2, 2019

(54) CURVED WINGLET

(71) Applicant: Airbus Operations Limited, Bristol (GB)

(72) Inventor: Geoffrey Richard Williams, Bristol (GB)

(73) Assignee: Airbus Operations Limited, Bristol (GB)

( * ) Notice: Subject to any disclaimer, the term of this patent is extended or adjusted under 35 U.S.C. 154(b) by 342 days.

(21) Appl. No.: 15/112,583

(22) PCT Filed: Jan. 19, 2015

(86) PCT No.: PCT/GB2015/050110
§ 371 (c)(1),
(2) Date: Jul. 19, 2016

(87) PCT Pub. No.: WO2015/107367
PCT Pub. Date: Jul. 23, 2015

(65) Prior Publication Data
US 2016/0340029 A1 Nov. 24, 2016

(30) Foreign Application Priority Data
Jan. 20, 2014 (GB) .................................. 1400878.3

(51) Int. Cl.
*B64C 23/06* (2006.01)
*B64F 5/00* (2017.01)

(52) U.S. Cl.
CPC .............. *B64C 23/069* (2017.05); *B64F 5/00* (2013.01); *Y02T 50/164* (2013.01)

(58) Field of Classification Search
CPC ......... B64C 23/069; B64F 5/00; Y02T 50/164
See application file for complete search history.

(56) References Cited

U.S. PATENT DOCUMENTS

| 5,275,358 | A | 1/1994 | Goldhammer et al. |
| 5,348,253 | A * | 9/1994 | Gratzer ................. B64C 23/069 244/91 |
| 6,484,968 | B2 * | 11/2002 | Felker ................... B64C 23/069 244/91 |
| 8,366,056 | B2 | 2/2013 | Garang |

(Continued)

FOREIGN PATENT DOCUMENTS

| CN | 101535124 | 9/2009 |
| CN | 101687543 | 3/2010 |

(Continued)

OTHER PUBLICATIONS

International Search Report cited in PCT/GB2015f050110, dated Mar. 25, 2015, three pages.

(Continued)

*Primary Examiner* — Valentina Xavier
(74) *Attorney, Agent, or Firm* — Nixon & Vanderhye P.C.

(57) ABSTRACT

A winglet 3 has an inner end 5 and an outer 7. The winglet 3 has a varying radius of curvature (R) which:(i) decreases along the winglet over a first distance $d_1$; (ii) remains constant over a second distance $d_2$; and (iii) increases along the winglet 3 over a third distance $d_3$. The sum of the first and third distances ($d_1+d_3$) is greater than the second distance ($d_2$). The radius of curvature may vary according to the equation $R=k_1/d^n$. The parameter n may be equal to 1, such that the curvature follows an Euler spiral.

23 Claims, 1 Drawing Sheet

(56) References Cited

U.S. PATENT DOCUMENTS

| | | | |
|---|---|---|---|
| 8,727,285 B2* | 5/2014 | Theurich | B64C 23/069 244/199.4 |
| 9,193,445 B2* | 11/2015 | Wright | B64C 23/065 |
| 9,550,563 B2 | 1/2017 | Theurich et al. | |
| 2002/0162917 A1* | 11/2002 | Heller | B64C 3/10 244/199.4 |
| 2009/0312989 A1 | 12/2009 | Dimitriadis | |
| 2011/0192937 A1 | 8/2011 | Buescher et al. | |
| 2012/0049010 A1* | 3/2012 | Speer | B64C 23/065 244/45 R |
| 2012/0275925 A1 | 11/2012 | Koegler et al. | |
| 2013/0092797 A1 | 4/2013 | Wright et al. | |
| 2014/0113017 A1 | 4/2014 | Kremer | |

FOREIGN PATENT DOCUMENTS

| | | |
|---|---|---|
| DE | 10 2011 017 460 | 10/2012 |
| EP | 1 349 778 | 2/2007 |
| GB | 2492978 | 1/2013 |
| WO | 2010/124877 | 11/2010 |
| WO | 2012/143363 | 10/2012 |
| WO | 2014065718 | 5/2014 |

OTHER PUBLICATIONS

Search Report cited in Application Serial No. GB1400878.3 dated Aug. 15, 2014, one page.

Further Search Report cited in Application Serial No. GB1400878.3 dated Sep. 10, 2014, one page.

Patel, Devik. SITEC Technical Report, "Analysis of the LS-7 WL Winglet," Reference No. SITEC_SEL2831_2013_01, Issue 1.0, dated Oct. 28, 2013, 44 pages.

Davies, Timothy. SITEC Technical Report, "Digital Capture of Rolladen-Schneider LS7-WL Glider," Reference No. SITEC_SEL2830_2013_01, Issue 1.0, dated Oct. 28, 2013, 31 pages.

* cited by examiner

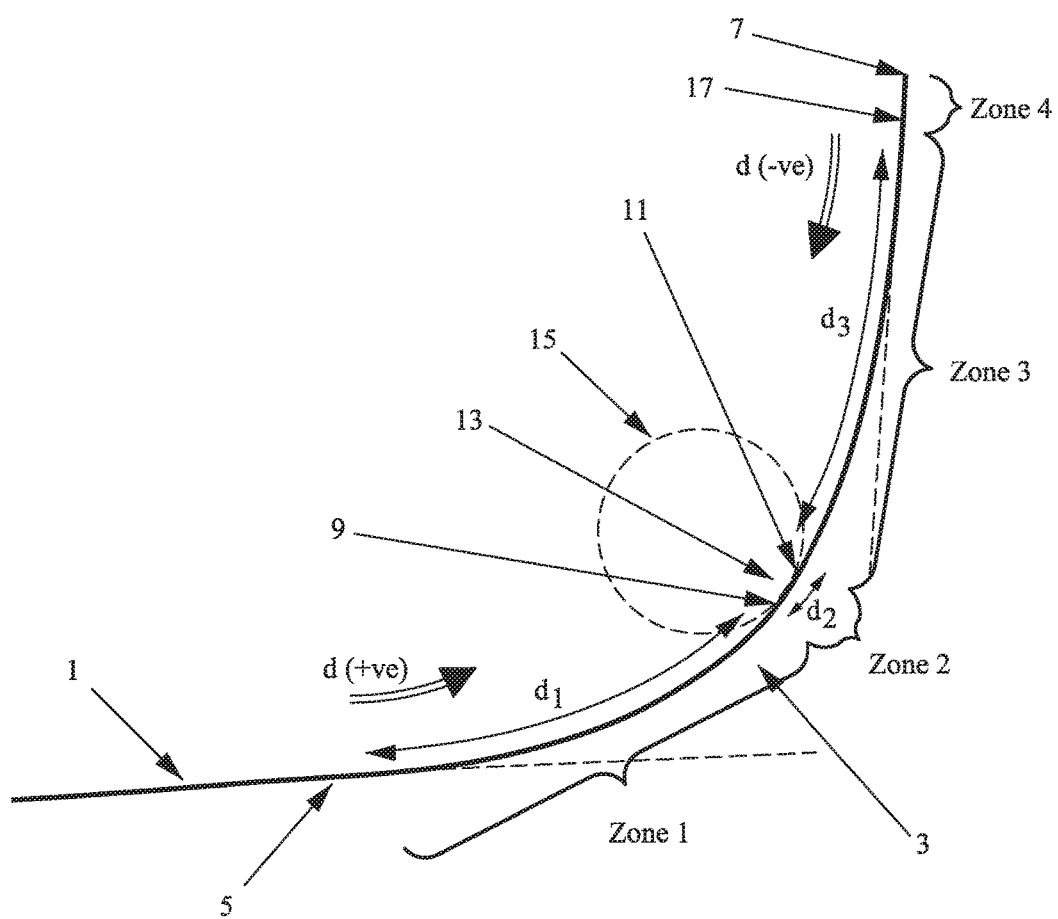

CURVED WINGLET

RELATED APPLICATIONS

This application is the U.S. national phase of International Application PCT/GB2015/050110 filed 19 Jan. 2015, which designated the U.S. and claims priority to GB 1400878.2 filed 20 Jan. 2014, wherein these applications are incorporated by reference.

TECHNICAL FIELD

The present invention relates to a winglet for an aircraft, a winglet and an aircraft wing, and to a method of designing a winglet.

BACKGROUND OF THE INVENTION

A variety of winglet designs are known. Many winglets are of a type that comprise an upwardly orientated planar winglet blade, attached to the end of the aircraft wing via a short, curved, transition zone. Examples of winglets of this type are shown, for example in U.S. Pat. Nos. 5,275,358 and 5,348,253.

Some alternative types of winglet design have also been proposed. For example, EP 1349778 discloses a winglet having an increasing radius of curvature as it extends from its inner end to its outer end. EP 1349778 discloses the possibility of the winglet following a generally elliptical curve.

The design of winglets to date has been primarily dictated by aerodynamic considerations, such as their impact on total drag (typically generating a reduction in induced drag and a (smaller) increase in profile/viscous drag). Structural considerations have tended to be a secondary focus in the design process.

SUMMARY OF THE INVENTION

The present invention seeks to provide an improved winglet.

According to a first aspect of the invention, there is provided an aircraft wing and a winglet on the tip thereof, the winglet having an inner end and an outer end the winglet having a varying radius of curvature (R) as it extends from its inner end to its outer end, and characterised in that the radius of curvature of the winglet:

(i) decreases along the winglet over a first distance $d_1$ from the inner end to a first location along the winglet;

(ii) remains constant over a second distance $d_2$ from the first location to a second location along the winglet; and (iii) increases along the winglet over a third distance $d_3$ from the second location to a third location along the winglet and wherein the sum of the first and third distances ($d_1+d_3$) is greater than the second distance ($d_2$).

A winglet with a radius of curvature that decreases as the winglet extends away from its inner end, and that then increases again as the winglet extends towards it outer end, has been found to be beneficial both structurally and aerodynamically. In particular, such a curvature may ensure a relatively gentle curve between the (typically planar wing) and the winglet. This gives rise to a number of benefits: it tends to mitigate shock formation at the junction; the curved shape has been found to enable a relatively smooth stress distribution in the winglet and the wing tip during use; and/or the shape enables relatively easy access for when the winglet is assembled.

The curvature of the winglet is typically measured along the ¼ chord line (which is the reference line about which the wing/winglet twist is determined). The curvature is measured in the frontal projection of this ¼ chord line (i.e. from a frontal view that is independent of sweep). In some embodiments of the invention, the curvature may be measured along the mid-box line (i.e. mid-way between the front and rear spars).

The inner end of the winglet should be readily identifiable to the skilled person and is the location at which the curvature starts to deviate from the (substantially planar) wing tip. For a detachable winglet, the inner end of the winglet is typically the part which attaches to the wing tip.

Over the first distance d1, the radius of curvature may vary according to the equation $R=k_1/d^n$, where $k_1$ is a constant, d is the distance along the winglet measured in an outward direction, and n>0. Having a radius of curvature that varies over the first distance according to this equation has been found to be especially beneficial both aerodynamically and structurally. In principle, the curvature of the winglet over the first distance may follow any portion of a curve governed by the above-mentioned equation (i.e. the distance d may be >0 at the inner end of the winglet). However, in most embodiments of the invention the inner end of the winglet will be planar, to blend with the tip of the wing. Accordingly, the distance d is preferably measured from an origin (d=0) at the inner end of the winglet, such that the inner end of the winglet is substantially planar.

Over the third distance $d_3$, the radius of curvature may vary according to the equation $R=k_2/d^n$, where $k_2$ is a constant, d is the distance along the winglet measured in an inward direction, and n>0. Having a radius of curvature that varies over the third distance according to this equation has been found to be especially beneficial both aerodynamically and structurally. In principle, the curvature of the winglet over the third distance may follow any portion of a curve governed by the above-mentioned equation (i.e. the distance d may be >0 at the third location). Thus, the distance d may be measured from an origin located beyond the third location, such that the winglet is curved at the third location. Alternatively, the distance d may be measured from an origin at the third location, such that the winglet is substantially planar at the third location.

The winglet may be of a shape where $0.25 \leq n \leq 4$. The winglet may be of a shape where $0.25 \leq n \leq 2$. The winglet may be of a shape where $0.5 \leq n \leq 1.5$. The winglet may be of a shape where n=1 such that the winglet curves as an Euler spiral over the first distance d1 and/or the third distance $d_3$. Having the winglet curving over the first or the third distances (and more preferably over the first and the third distances) as an Euler spiral has been found to be especially beneficial in terms of ensuring a smooth stress distribution in the winglet. Euler spirals (also known as a spiros, or Cornu sprirals) have a curvature that changes linearly along the length of the winglet.

The third location may be at the outer end of the winglet. Alternatively, the winglet may include a portion, typically a relatively small portion, beyond the third location. In these embodiments, the sum of the first, second and third distances $d_1+d_2+d_3$, may be at least 80%, and more preferably at least 90%, of the distance from the inner to the outer end of the winglet. In embodiments having the portion beyond the third location, this portion may be substantially planar.

The second distance $d_2$ is preferably relatively small compared to the first and third distances $d_1$ and $d_3$. The second distance $d_2$ may be no more than 20% of the sum of the first and third distances $d_1+d_3$. The second distance $d_2$ may be no more than 10% of the sum of the first and third distances d1+d3. In some embodiments of the invention, the second distance $d_2$ may be substantially zero.

Since the radius of curvature between the first and second locations is constant, it will be appreciated that the radius of curvature at the first location is equal to the radius of curvature at the second location. Accordingly, the minimum radius of curvature over the first distance (i.e. at the first location) is equal to the minimum radius of curvature over the third distance (i.e. at the second location), and the winglet tends not to contain any discontinuities in curvature between the zones.

The present invention is of particular benefit when there is a single winglet on the tip of the wing because such winglets tend to experience relatively large loads (compared to multiple, smaller, winglets). The trailing edge of the winglet may be a continuation of the trailing edge of the wing. The leading edge of the winglet may be a continuation of the leading edge of the wing. Such an arrangement distinguishes from arrangements in which there are multiple winglets, staggered along the wing tip in the chordwise direction.

The outer end of the winglet may be substantially vertical. For example, the outer end of the winglet may be canted at less than 20 degrees, and more preferably less than 10 degrees to the vertical. It tends to be beneficial to have vertical or substantially vertical winglets because, for a given length of winglet, such an arrangement tends to better comply with aircraft gate limits as the span is relatively small.

The winglet may be downwardly extending, but more preferably the winglet is upwardly extending.

According to another aspect of the invention, there is provided a winglet for use as the winglet in the first aspect of the invention described herein. The winglet may have an inner end and an outer end, and the winglet may curve as it extends from its inner end to its outer end. The radius of curvature (R) of the winglet may:

(i) decrease along the winglet over a first distance $d_1$ from the inner end to a first location along the winglet;

(ii) remain constant over a second distance $d_2$ from the first location to a second location along the winglet; and (iii) increase along the winglet over a third distance $d_3$ from the second location to a third location along the winglet and the sum of the first and third distances ($d_1+d_3$) may be greater than the second distance ($d_2$).

According to another aspect of the invention, there is provided a method of designing a winglet for fitting to an aircraft wing, the method comprising the steps of:

creating a model of a winglet fitted to a wing, the winglet having a first curvature;

modelling the stress distribution in the winglet and the end of the wing during use;

modifying the curvature of the winglet over a first distance $d_1$, from the inner end of the winglet to a first location along the winglet, the curvature being modified to improve the stress distribution between the winglet and the wing during use. In contrast to known methods of winglet design in which only aerodynamic considerations tend to determine the curvature, the present invention recognises that the curvature of the winglet can be modified to improve the structural loading in the wing/winglet.

The curvature may be modified to provide a smoother stress distribution between the winglet and the wing during use. The winglet having a first curvature may have a curvature according to the winglet in the first aspect of the invention. The curvature may be modified by changing the rate of decrease in the radius of curvature over the first distance. The curvature may be modified by changing the rate of increase in the radius of curvature over the third distance.

It will be appreciated that any features described with reference to one aspect of the invention are equally applicable to any other aspect of the invention, and vice versa.

DESCRIPTION OF THE DRAWINGS

An embodiment of the invention will now be described, by way of example only, with reference to the accompanying schematic drawing of which:

FIG. 1 is a schematic view of a winglet and wing according to a first embodiment of the invention.

DETAILED DESCRIPTION

FIG. 1 shows the ¼ chord line of a wing 1 and an upwardly extending winglet 3 from a frontal view (i.e. in a vertical plane, perpendicular to the aircraft longitudinal axis (not shown)). The wing ¼ chord line is shown in a lightweight line, and the winglet ¼ chord line is shown in a heavier-weight line.

The winglet is of conventional airfoil section (not shown). The leading edge of the winglet is a continuation of the leading edge of the wing, and the trailing edge of the winglet is a continuation of the trailing edge of the wing.

The ¼ chord line is the line about which the wing and winglet twist is defined. This ¼ chord line is used to define the curvature of the winglet. That curvature is described in more detail below.

According to the first embodiment, the winglet 3 has a varying radius of curvature (R) as it extends from its inner end 5 to its outer end 7. The radius of curvature of the winglet can be broken down into four zones, each blending with the adjacent zone.

Analysing the winglet from the inner end 5 outwards, there is a first zone (zone 1) extending over a first distance $d_1$ from the inner end 5 to a first location 9 along the winglet. In zone 1 the curvature of the winglet varies according to an Euler spiral. Thus the radius of curvature $R=k_1/d$, where $k_1$ is a constant and d is the distance along the spiral. In this embodiment, distance d is measured outwardly (labelled with an arrow in FIG. 1) from an origin at the inner end 5 of the winglet 3. Thus, the radius of curvature is infinite (i.e. there is zero curvature) at the inner end (d=0) and the radius of curvature decreases along the first distance $d_1$ along the winglet 3.

From the first location 9 to a second location 11, the radius of curvature is constant, as shown by the arc 13 of circle 15 in FIG. 1. The length $d_2$ of this constant curvature zone (labelled zone 2) is relatively small (around 3%) of the lengths $d_1+d_3$ of the adjacent zones (Zones 1 and 3). In some other embodiments (not shown), this region may be of zero length.

From the second location 11 to a third location 17 (zone 3), the radius of curvature increases over distance $d_3$. In zone 3 the curvature of the winglet also varies according to an Euler spiral, but with the distance along the curve instead being measured in an inward direction. Thus the radius of curvature $R=k_2/d$, where $k_2$ is a constant and d is the distance (measured inwardly—labelled with an arrow in FIG. 1) along the spiral. In this embodiment, distance d is measured from an origin at the third location 17 on the winglet 3. Thus, the radius of curvature is infinite (i.e. zero curvature) at the third location 17 (d=0).

The fourth and final zone, zone 4, extends from the third location 17 to the outer end 7 of the winglet 3. This zone is a relatively small planar extension from the third location 17.

In the first embodiment of the invention, the lengths $d_1$ and $d_3$ of zones 1 and 3 respectively are the same. However, in other embodiments of the invention, the lengths may be different. In the first embodiment, constants $k_1$ and $k_2$ are also equal, but in other embodiments these constants need not necessarily be the same, and the curvature in zones 1 and 3 may be different.

The winglet shown in FIG. 1 has been found to be especially beneficial both structurally and aerodynamically. In particular, the curvature in zone 1 is such that there is a relatively gentle curve between the planar wing 1 and the winglet 3. This tends to mitigate shock formation at the junction. In addition, the curved shape of zones 1-3 has been found to enable a relatively smooth stress distribution in the winglet 3 and the wing tip 1 during use.

In other embodiments of the invention (not shown), the curvature in zones 1 and/or 3 varies according to the equation $R=k_1/d^n$. However, rather than an Euler spiral (n=1), 0.5<n<1 or 1<n<1.5 such that the winglets exhibit other variations in curvature.

The winglet 3 in FIG. 1 was designed using a novel method in which the stress distribution was taken into account when determining the winglet curvature. The method involved the following steps:

(i) creating a computer model of a winglet fitted to a wing, the winglet having a first curvature;

(ii) modelling the stress distribution in the winglet and the end of the wing during use; and (iii) modifying the curvature of the winglet over the first distance $d_1$. Notably, the curvature was modified to smooth the stress distribution between the winglet and the wing during use. Using this as an iterative method, a winglet with a curvature that resulted in an improved stress distribution was obtained.

Whilst the present invention has been described and illustrated with reference to particular embodiments, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft wing and a winglet on the tip thereof, the winglet comprising:
an inner end and an outer end, and
the winglet having a varying radius of curvature (R) extending from the inner end to the outer end, and wherein the radius of curvature of the winglet:
(i) decreases along the winglet over a first distance $d_1$ from the inner end to a first location along the winglet;
wherein over the first distance $d_1$ the radius of curvature varies according to an equation $R=k_1/d^n$, where $k_1$ is a constant, d is a distance along the winglet measured in an outward direction, and n is greater than zero;
(ii) remains constant over a second distance $d_2$ from the first location to a second location along the winglet; and
(iii) increases along the winglet over a third distance $d_3$ from the second location to a third location along the winglet, wherein the sum of the first and third distances ($d_1+d_3$) is greater than the second distance ($d_2$).

2. The aircraft wing and winglet according to claim 1, wherein the distance d is measured from an origin at the inner end of the winglet, and the inner end of the winglet is substantially planar.

3. An aircraft wing and winglet comprising:
an inner end and an outer end, and
the winglet having a varying radius of curvature (R) extending from the inner end to the outer end, and wherein the radius of curvature of the winglet:
(i) decreases along the winglet over a first distance $d_1$ from the inner end to a first location along the winglet,
(ii) remains constant over a second distance $d_2$ from the first location to a second location along the winglet, and
(iii) increases along the winglet over a third distance $d_3$ from the second location to a third location along the winglet, wherein the sum of the first and third distances ($d_1+d_3$) is greater than the second distance ($d_2$),
wherein over the third distance $d_3$, the radius of curvature varies according to an equation $R=k_2/d^n$, where $k_2$ is a constant, d is the distance along the winglet measured in an inward direction, and n is greater than zero.

4. The aircraft wing and winglet according to claim 3, wherein the distance d is measured from an origin located beyond the third location, and the winglet is curved at the third location.

5. The aircraft wing and winglet according to claim 3, wherein the distance d is measured from an origin at the third location, and the winglet is substantially planar at the third location.

6. The aircraft wing and winglet according to claim 1, wherein $0.5 \leq n \leq 1.5$.

7. The aircraft wing and winglet according to claim 6, wherein n=1 such that the winglet curves as an Euler spiral over the third distance $d_3$.

8. The aircraft wing and winglet according to claim 1, wherein the third location is at the outer end of the winglet.

9. The aircraft wing and winglet according to claim 1, wherein the sum of the first, second and third distances ($d_1+d_2+d_3$), is at least 90% of a distance from the inner end to the outer end of the winglet.

10. The aircraft wing and winglet according to claim 9, wherein the winglet from the third location to the outer end of the winglet is substantially planar.

11. The aircraft wing and winglet according claim 1, wherein the second distance $d_2$ is no more than 20% of the sum of the first and third distances $d_1+d_3$.

12. The aircraft wing and winglet according to claim 11, wherein the second distance $d_2$ is substantially zero.

13. The aircraft wing and winglet according to claim 1, further comprising a trailing edge of the winglet being a continuation of a trailing edge of the wing, and a leading edge of the winglet being a continuation of a leading edge of the wing.

14. The aircraft wing and winglet according to claim 1, wherein the outer end of the winglet is substantially vertical.

15. The aircraft wing and winglet according to claim 1, wherein the winglet is upwardly extending.

16. A winglet comprising:
an inner end and an outer end,
the winglet curving from the inner end to the outer end, and
a radius of curvature (R) of the winglet which:
(i) decreases along the winglet over a first distance $d_1$ from the inner end to a first location along the winglet; wherein over the first distance $d_1$, the radius of curvature varies according to an equation $R=k_1/d^n$, where $k_1$ is a constant, d is a distance along the winglet measured in an outward direction, and n is greater than zero;
(ii) remains constant over a second distance $d_2$ from the first location to a second location along the winglet; and
(iii) increases along the winglet over a third distance $d_3$ from the second location to a third location along the winglet,
wherein the sum of the first and third distances $(d_1+d_3)$ is greater than the second distance $(d_2)$.

17. A method of designing a winglet for fitting to an aircraft wing comprising:
creating a model of a winglet fitted to a wing, the winglet having a first curvature;
modelling a stress distribution in the winglet and at an end of the wing during use; and
modifying the first curvature of the winglet over a first distance $d_1$, from the inner end of the winglet to a first location along the winglet, the first curvature being modified to smooth a stress distribution between the winglet and the wing during use;
wherein over the first distance $d_1$, a radius of the first curvature varies according to an equation $R=k_1/d^n$, where $k_1$ is a constant, d is a distance along the winglet measured in an outward direction, and n is greater than zero.

18. The method according to claim 17, wherein the first curvature is modified to provide a smoother stress distribution between the winglet and the wing during use and compared to a stress distribution between the winglet having the first curvature and the wing during use.

19. The method according to claim 17, wherein the radius of curvature of the winglet decreases over the first distance $d_1$, and the first curvature is modified by changing the rate of decrease in the radius of curvature.

20. A winglet comprising:
an inner end configured to attach to or be integrated on a tip of a wing;
an outer end, and
a curvature of the winglet which:
(i) decreases along a first span of the winglet extending in a spanwise direction a first distance $d_1$ from the inner end to a first location along the winglet, wherein the curvature along the first span conforms to an equation $R=k_1/d^n$, where $k_1$ is a constant, d is an outward distance from $d_1$ in the spanwise direction, and n is greater than zero;
(ii) is constant along a second span of the winglet extending in the spanwise direction a second distance $d_2$ from the first location to a second location along the winglet, and
(iii) increases along a third span of the winglet extending in the spanwise direction a third distance d3 from the second location to a third location along the winglet, and
a sum of the first and third distances $(d_1+d_3)$ is greater than the second distance $(d_2)$.

21. The winglet as in claim 20 further comprising a leading edge and a trailing edge each extending between the inner end and the outer end, wherein the curvature of the winglet is along a line spaced from the leading edge by on quarter of a chord line between the leading and trailing edges.

22. The winglet of claim 20, wherein the curvature along the third span varies according to an equation $R=k_2/d^n$, where $k_2$ is a constant, d is the distance in the spanwise direction along the winglet in an inward direction, and n is greater than zero.

23. The winglet of claim 20, wherein the sum of the first, second and third distances $(d_1+d_2+d_3)$ is at least 90% of a distance in the spanwise direction from the inner end to the outer end of the winglet.

* * * * *